(12) United States Patent
Nishina et al.

(10) Patent No.: US 8,199,371 B2
(45) Date of Patent: Jun. 12, 2012

(54) IMAGE READER AND IMAGE FORMATION APPARATUS

(75) Inventors: Kiichiro Nishina, Yokohama (JP);
Yasuo Sakurai, Yokohama (JP);
Nobuaki Ono, Yokohama (JP);
Masahiro Itoh, Sagamihara (JP);
Yoshifumi Sudoh, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 656 days.

(21) Appl. No.: 12/389,222

(22) Filed: Feb. 19, 2009

(65) Prior Publication Data

US 2009/0213440 A1    Aug. 27, 2009

(30) Foreign Application Priority Data

Feb. 25, 2008  (JP) ................................ 2008-043308
Mar. 3, 2008   (JP) ................................ 2008-052096

(51) Int. Cl.
*H04N 1/04* (2006.01)

(52) U.S. Cl. ........ 358/474; 358/475; 358/509; 358/496; 358/497

(58) Field of Classification Search .................. 358/474, 358/486, 497, 496, 498, 501, 475, 509
See application file for complete search history.

(56) References Cited

U.S. PATENT DOCUMENTS

| | | | |
|---|---|---|---|
| 4,638,987 A | 1/1987 | Sakurai et al. | |
| 4,715,597 A | 12/1987 | Sakurai et al. | |
| 5,038,227 A * | 8/1991 | Koshiyouji et al. | 358/471 |
| 5,798,841 A * | 8/1998 | Takahashi | 358/296 |
| 5,986,774 A * | 11/1999 | Han | 358/487 |
| 6,281,990 B1 * | 8/2001 | Takahashi | 358/474 |
| 6,400,472 B1 * | 6/2002 | Yoshimizu | 358/498 |
| 6,906,830 B1 * | 6/2005 | Hayashi | 358/474 |
| 6,995,878 B2 * | 2/2006 | Fukuzawa | 358/474 |
| 7,209,702 B2 | 4/2007 | Kohchi et al. | |
| 7,330,692 B2 | 2/2008 | Kohchi et al. | |
| 7,438,443 B2 | 10/2008 | Tatsuno et al. | |
| 7,733,538 B2 * | 6/2010 | Kanesaka et al. | 358/474 |
| 8,077,193 B2 * | 12/2011 | Tomioka | 347/241 |
| 2005/0088707 A1 | 4/2005 | Sakurai et al. | |
| 2005/0200917 A1 * | 9/2005 | Kanesaka et al. | 358/486 |
| 2006/0008295 A1 | 1/2006 | Kohchi et al. | |
| 2006/0187500 A1 | 8/2006 | Sakurai | |
| 2006/0197822 A1 | 9/2006 | Sakurai | |
| 2006/0279961 A1 | 12/2006 | Sakurai | |
| 2007/0216969 A1 | 9/2007 | Nishina | |
| 2008/0063313 A1 | 3/2008 | Nishina | |
| 2008/0218724 A1 | 9/2008 | Nishina et al. | |
| 2008/0278779 A1 | 11/2008 | Nishina et al. | |

(Continued)

FOREIGN PATENT DOCUMENTS

JP          62-279775      12/1987

(Continued)

*Primary Examiner* — Negussie Worku
(74) *Attorney, Agent, or Firm* — Dickstein Shapiro LLP

(57) ABSTRACT

An image reader feeds a document to read document information at a still position from below a glass platen. The image reader is configured to include a document feeder unit feeding a document in a predetermined direction, a glass platen provided below the document feeder unit, an illumination unit provided on or above the glass platen and including a surface light source which is long in a direction orthogonal to the predetermined direction and illuminates the document, and a document reader unit reading document information at a still position from below the glass platen. Such an image reader can illuminate documents efficiently with less electric power and achieve thinning of the illumination unit.

11 Claims, 17 Drawing Sheets

U.S. PATENT DOCUMENTS

2009/0190193 A1 * 7/2009 Sato .............................. 358/505

FOREIGN PATENT DOCUMENTS

| | | |
|---|---|---|
| JP | 06-217083 | 8/1994 |
| JP | 06-326825 | 11/1994 |
| JP | 11-146140 | 5/1999 |
| JP | 2000-115470 | 4/2000 |
| JP | 2000-351482 | 12/2000 |
| JP | 2005-229238 | 8/2005 |
| JP | 2005-278132 | 10/2005 |
| JP | 2006-025303 | 1/2006 |
| JP | 2006-060528 | 3/2006 |
| JP | 2007-013913 | 1/2007 |
| JP | 2009-105619 | 5/2009 |
| JP | 2009-111812 | 5/2009 |

* cited by examiner

IMAGE READER AND IMAGE FORMATION APPARATUS

CROSS REFERENCE TO RELATED APPLICATION

The present application is based on and claims priority from Japanese Patent Application No. 2008-43308, filed on Feb. 25, 2008 and No. 2008-52096, filed on Mar. 3, 2008, the disclosure of which is hereby incorporated by reference in its entirety.

BACKGROUND OF THE INVENTION

1. Field of the Invention

The present invention relates to an image reader which can feed a document and read document information at a still position from below a glass platen, as well as to an image formation apparatus incorporating such an image reader.

2. Description of the Related Art

A facsimile machine or a digital copier is provided with an image reader which includes an illumination system, an optical read system, a line sensor, and so on. The illumination system illuminates a document and the optical read system focuses a reflected light therefrom on the line sensor to photoelectrically convert image information into signals. There are two ways for such an image reader to read a document. One is a platen type reading in which a document is placed on a glass platen, pressed with a platen cover and read by moving illumination system and optical system. The other is a sheet-through type reading in which a document is automatically fed via an automatic document feeder (ADF) to the glass platen as an exposure position of the optical system and read by fixed illumination system and optical system. The sheet-through type reading can enhance work efficiency of the read operation.

FIG. 17 schematically shows a prior art image reader with three mirrors and a reducing focusing lens. Such an image reader comprises a first scanning member 3 having glass platen 2-2 and a first mirror 3-a, a second scanning member 4 having a second mirror 4-a and a third mirror 4-b, a reducing focusing lens 5, a line sensor 6, an illumination system 7, and an ADF 8. In the platen type reading, a document is placed on the glass platens 2-1, 2-2, and the first scanning member 3 is moved to a read start position 3-2 and the second scanning member 4 is moved to a platen read start position 4-2. A light is reflected by the first mirror 3-a and then by the second and third mirrors 4-a, 4-b, guided to the reducing focusing lens 5, and focused on the line sensor 6. For reading the document, the first scanning member 3 is moved to a read position 3-3 at a predetermined speed, and the second scanning member 4 is moved to a read position 4-3 at half a speed of that of the first scanning member 3.

In the sheet-through type reading, while the illumination system 7, the first and second scanning members 3, 4 are stopped at a position C, a document 1 is fed from a tray A of the ADF 8 to a point B of the glass platen 2-1 at a constant speed. The document 1 is illuminated by the illumination system 7. Then, light from the document 1 is reflected by the first mirror 3-a of the first scanning member 3 then by the second and third mirrors 4-a, 4-b, guided to the reducing focusing lens 5, and focused on the line sensor 6.

Tubular lamps such as xenon lamps, halogen lamps are for use in the image reader as a light source. However, these lamps are disadvantageous since they consume much electric power and generate a lot of heat, leading to increases in power consumption and temperature of the entire unit. For this reason, the tubular lamps have come to be replaced by an LED which consumes less power and generates less heat. However, because the LED is a point light source, it is necessary to dispose an optical system so as to diffuse or gather light for illuminating a document. For example, Japanese Unexamined Patent Application Publication No. 2006-25303 discloses an illumination unit in which LEDs are aligned in an array to illuminate a document via an optical guide. Also, Japanese Unexamined Patent Application Publication No. 2005-278132 discloses an illumination unit in which a long lens system is disposed before arranged LEDs, so as to enhance a degree of light focus in a direction perpendicular to the arrangement of the LEDs. However, this illumination unit still holds problems in increasing the size of the optical system and the number of components, complexing adjustment of the optical system and the illumination system, increasing manufacture costs and the like.

In view of solving the above problems, an illumination unit using an organic electroluminescence (organic EL) has been developed as a surface-emitting light source. Japanese Unexamined Patent Application Publication No. 2000-115470 discloses a technique to illuminate a document with two closely disposed surface light sources and read document information from a space between the two surface light sources. However, light from a light emitting surface of the surface light source tends to be brightest over a center portion thereof despite the fact that a document is read with light from the periphery portions of the light emitting surface. Therefore, this technique has a drawback of low lighting efficiency and impracticality. In order to improve lighting efficiency, Japanese Unexamined Patent Application Publication No. 2007-13913 discloses a technique to increase amount of light at a read position of a document by disposing a reflective member on a surface light source. Further, Japanese Unexamined Patent Application Publication No. Hei 6-217083 discloses a technique to form a large number of microprisms on the light emitting surface of a surface light source in order to enhance directivity of light in an emission direction illuminating a document. Japanese Unexamined Patent Application Publication No. 2006-60528 discloses an illumination unit in which a surface light source is directly disposed at the backside (opposite to a document side) of a glass platen.

Generally, it is assumed that Lambert distribution occurs on a light emitting surface and amount of light illuminating the document decreases inversely proportional to square of a distance between the light emitting surface and the document. Disposing the reflective member between the light emitting surface and the read position increases the distance therebetween; therefore illuminance on the document surface is likely to decrease. It can be configured to collect light on the reflective member. However, it is difficult to adjust the position of the reflective member since illuminance on the document will not be even depending on the position of the reflective member. This further causes an increase of the size of the illumination system. Forming a large number of microprisms on the light emitting surface of the reflective member will increase manufacture costs, and make the distance between the document and the illumination unit longer, decreasing illuminance on the document and lighting efficiency. With regard to disposing the light source at the backside of the glass platen, the illumination unit and the glass platen have to be integrated so that it cannot apply to an image reader with such a structure that the illumination unit moves under the glass platen, as shown in FIG. 10.

Moreover, in recent years there have been demands for reducing the size of an optical system of the image reader in a height direction and reducing the thickness of the illumination unit. In order to achieve a decrease in the thickness of the illumination unit, however, the light source needs to be disposed as close to the document as possible (FIGS. 18A, 18B). In this case, an angle θ between emission direction of light and the document is smaller than that when the light and the document distance away from each other (FIGS. 18A). There is a problem that with the angle θ below a certain value, light may not pass through the glass platen towards the air and be totally reflected at the border of the glass platen and the air, disabling the illumination to the document.

SUMMARY OF THE INVENTION

In view of solving the above problems, an object of the present invention is to provide an image reader which can feed a document and read document information at a still position from below a glass platen and which achieves thinning of an illumination system and efficiently illuminates the document with reduced electric power, as well as to provide an image formation apparatus incorporating such an image reader.

According to one aspect of the present invention, an image reader is configured to include a document feeder unit feeding a document in a predetermined direction; a glass platen provided below the document feeder unit; an illumination unit provided on or above the glass platen and comprising a surface light source which is long in a direction orthogonal to the predetermined direction and illuminates the document: and a document reader unit reading information about the document at a still position from below the glass platen.

In features of this aspect, the illumination unit is disposed between an upper surface of the glass platen and the document.

In other features of this aspect, the surface light source is directly formed on the glass platen.

In other features of this aspect, the surface light source is an organic electroluminescence.

In other features of this aspect, the surface light source is tilted at an arbitrary angle.

In other features of this aspect, amounts of light which a central portion and a peripheral portion of the surface light source emit are independently variable, and amounts of light which the surface light source emits are set so that amounts of light are even on the document irrespective of a position of the document in the direction orthogonal to the predetermined direction.

In other features of this aspect, the illumination unit comprises a plurality of surface light sources which are disposed to face each other in the direction orthogonal to the predetermined direction.

In other features of this aspect, the illumination unit illuminates with white light.

In other features of this aspect, the document reader unit comprises an optical system which includes a color separation portion on an optical path, and it reads the information about the document in colors.

In other features of this aspect, the image reader is configured to further include a protector portion which protects the illumination unit from getting soiled.

In other features of this aspect, the protector portion is a document guide which guides the document to a feed path and prevents the document from directly contacting with the illumination unit.

According to another aspect of the present invention, an image formation apparatus is configured to include the above-described image reader.

DETAILED DESCRIPTION OF THE PREFERRED EMBODIMENTS

Hereinafter, embodiments of the present invention will be described in detail with reference to the accompanying drawings.

(First Embodiment)

Figure 1:
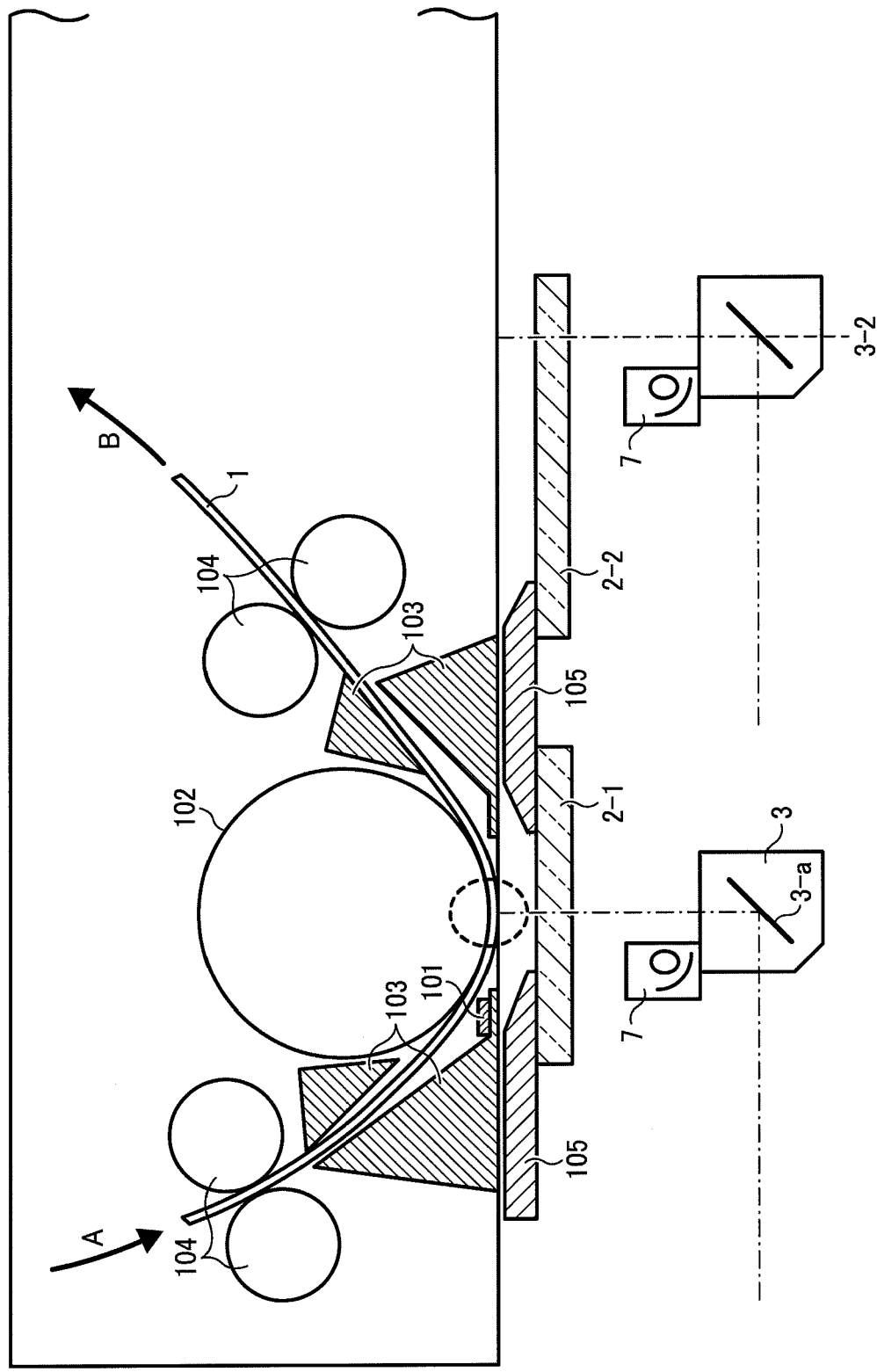
FIG. 1 shows a structure of an image reader according to a first embodiment of the present invention.

FIG. 1 schematically shows a sheet-through type image reader according to the first embodiment of the present invention. This image reader comprises, as an illumination unit a surface light source 101 between the upper surface (a side on which the document 1 passes) of a glass platen 2-2 and a document 1. The surface light source 101 is long in a direction orthogonal to a document feed direction (vertical direction relative to the document in FIG. 1) and is provided on a document guide 103. In sheet-through type reading, the document fed from A direction in the drawing is guided by a pair of auxiliary feed rollers 104 and the document guide 103 and fed to a read position (indicated by a dotted circle) by a feed roller 102. Then, light from the surface light source 101 on the document guide 103 is reflected by a first mirror 3-*a* of a first scanning member 3 and focused on a line sensor by an optical system in the same manner as in the prior art. The document 1 is discharged to B direction by another pair of auxiliary feed rollers 104 via the document guide 103. In platen type reading, the document is illuminated by an illumination system 7 provided in the first scanning member 3 to read document information, as in the prior art.

In the image reader as configured above, the surface light source 101 is disposed at an arbitrary position between the glass platen 2-2 and the document 1 to be so close to the documents 1 as to almost get in contact therewith without light's passing through the glass platen 2-2. Accordingly, there is no total reflection on the incident and exit surfaces of the glass platen 2-2, and no loss in amount of illumination, which enables the document 1 to be illuminated with proper illuminance. Illuminance on the document 1 is inversely proportional to a distance between the document 1 and the surface light source 101, so that placing the surface light source 101 close to the document 1 makes it possible to illuminate the document with sufficient illuminance without increasing amount of light from the surface light source 101. Further, forming the surface light source 101 to be long in a direction orthogonal to the document feed direction can increase the size of the light emission area. Without special light-gathering means, it is possible to attain required illuminance on the document. Furthermore, as an illumination system it does not need to include focusing means such as a lens or a prism, which advantageously leads to downsizing the image reader.

(Second Embodiment)

Figure 2:
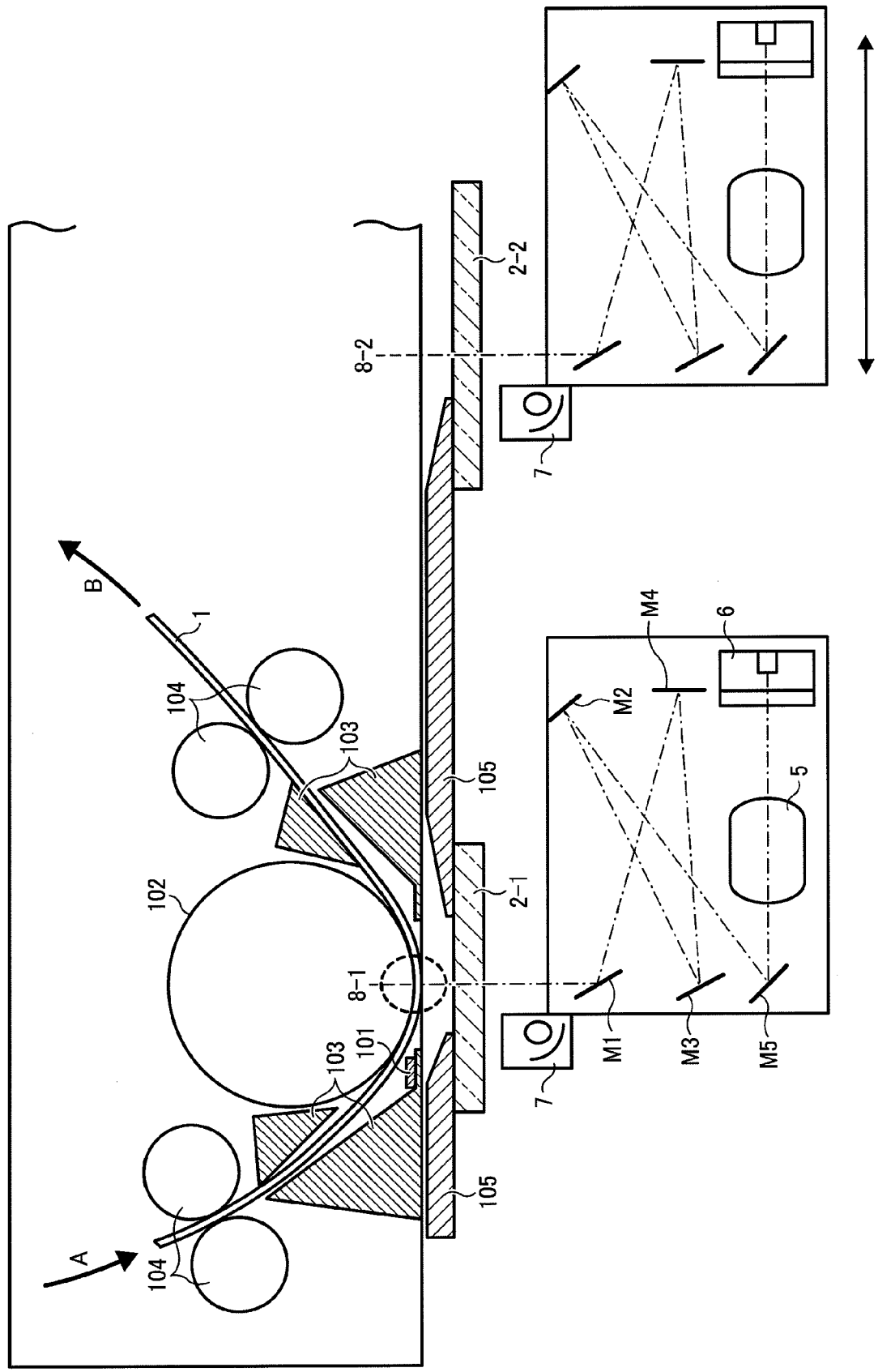
FIG. 2 shows a structure of an image reader according to a second embodiment of the present invention.

FIG. 2 shows an example of a sheet-through type image reader using an optical system integrated with a line sensor. In the drawing, while an optical system stops at a position 8-1, the document 1 is fed by the ADF and illuminated by the surface light source 101. The light from the document 1 is reflected by five mirrors M1 to M5, guided to a reducing focusing lens 5, and focused on the line sensor 6, to read document information. In the platen type reading, the optical system including the illumination system 7 moves to a position 8-2 to scan the document and read information thereon.

(Third Embodiment)

Figure 3:
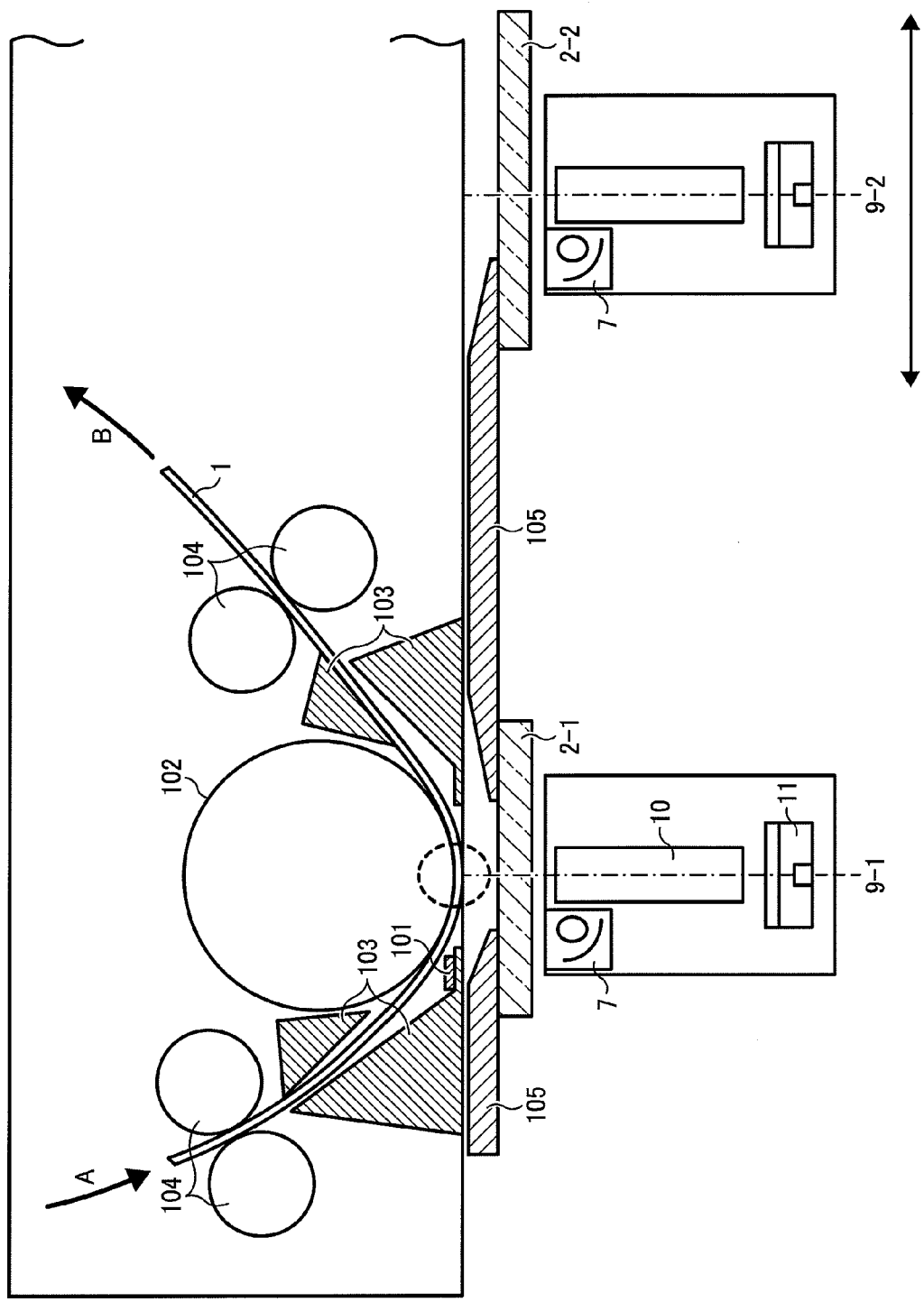
FIG. 3 shows a structure of an image reader according to a third embodiment of the present invention.

FIG. 3 shows an example of a sheet-through type image reader using an optical system with lens magnifier=1. In the drawing while an optical system having a focusing element 10 (lens magnifier=1) stops at a position 9-1, the document 1 is fed by the ADF and illuminated by the surface light source 101. The light from the document 1 is focused on a line sensor 11 (magnifier=1) by the focusing element 10, to read document information. In the platen type reading, the optical system including the illumination system 7 moves to a position 9-2 to scan the document and read information thereon.

(Fourth Embodiment)

Figure 4A:
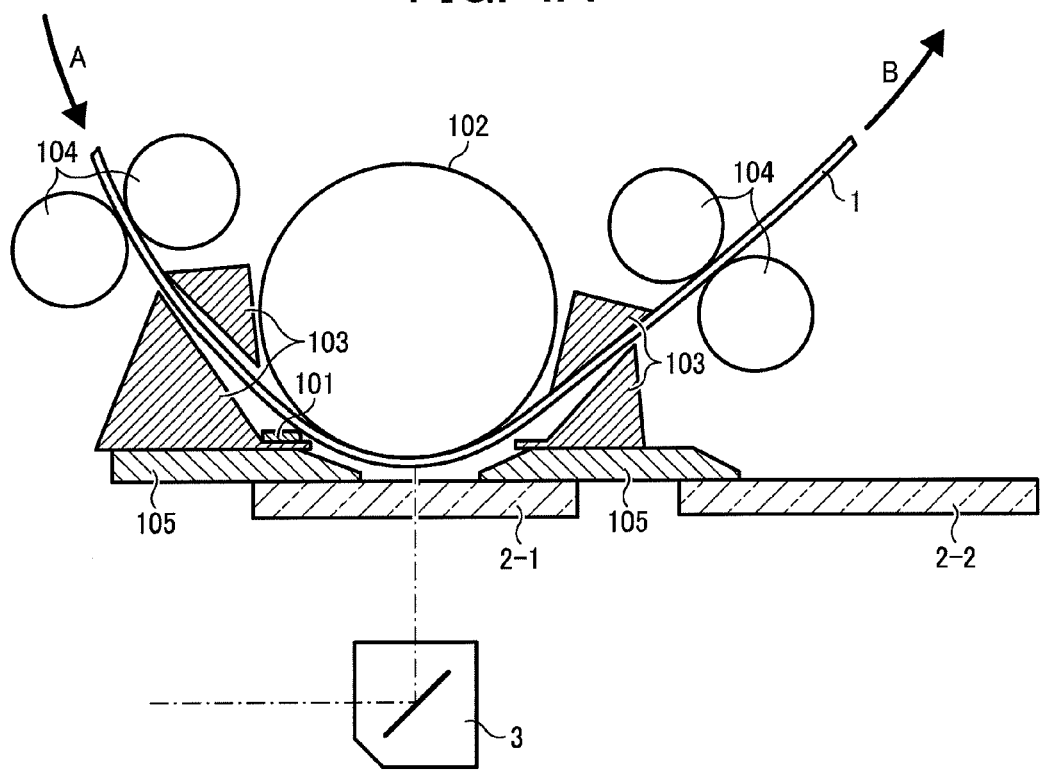
FIG. 4A shows a structure of an image reader according to a fourth embodiment of the present invention.
Figure 4B:
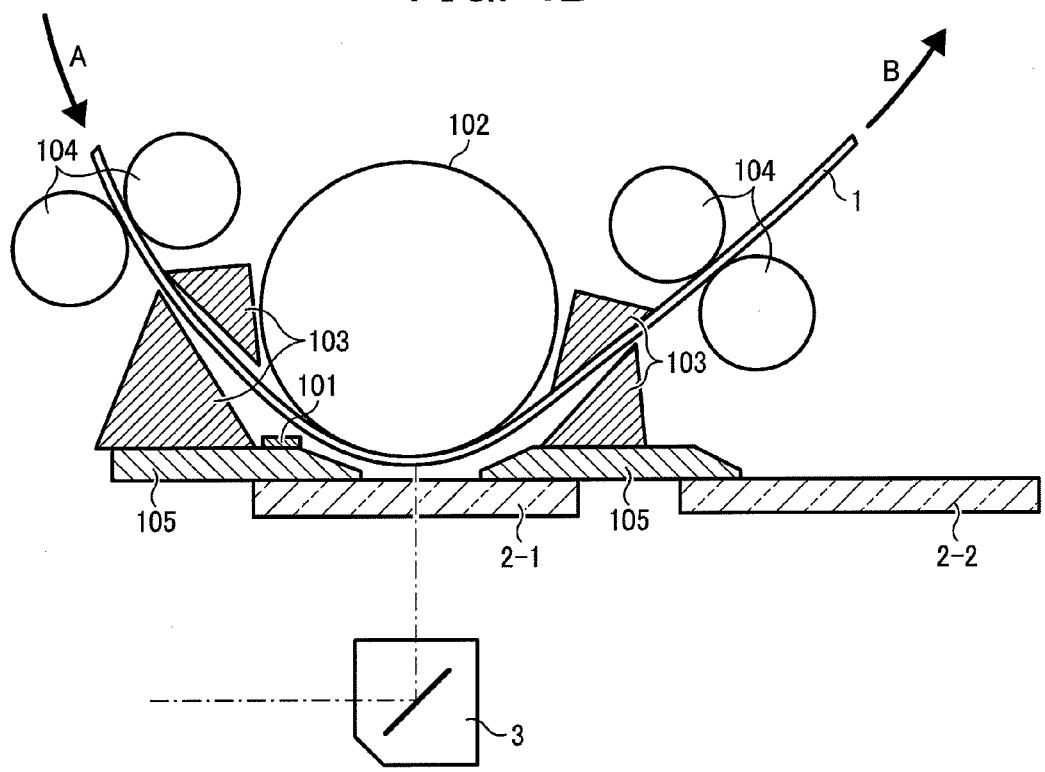
FIG. 4B shows another structure of the image reader according to the fourth embodiment of the present invention.

Using an organic electroluminescence (organic EL) for the surface light source 101 in the sheet-through type image reader as configured above makes it possible to form the surface light source 101 in an arbitrary member which is disposed close to a read position of a document feed path. This eliminates the necessity for components such as a support member for the surface light source 101, reducing the number of components and achieving a small-sized illumination unit with sufficient illuminance on the document. FIGS. 4A, 4B show examples of using an organic EL for the surface light source 101. FIG. 4A shows an example in which an organic EL as the surface light source 101 is formed in the document guide 103 while FIG. 4B shows an example in which an organic EL as the surface light source 101 is formed in a glass platen support member 105.

Figure 5:
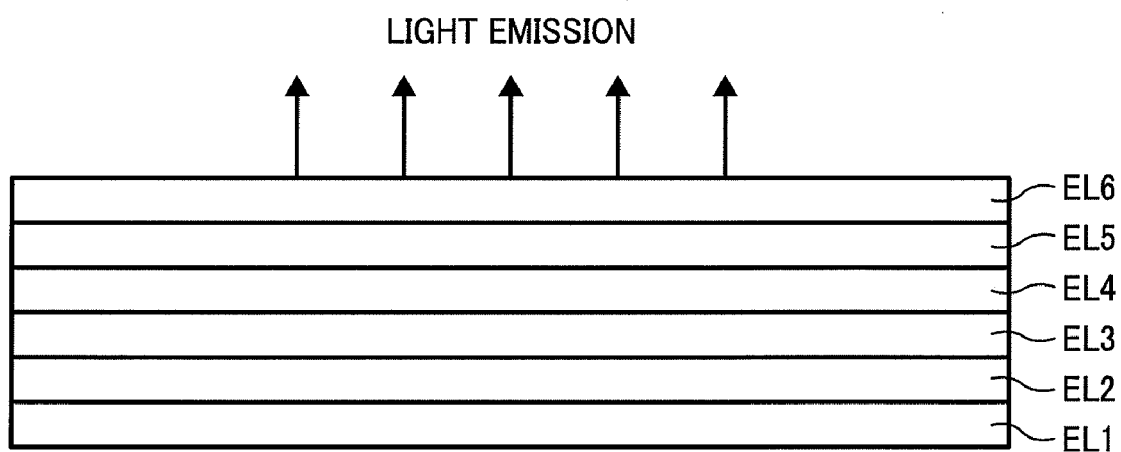
FIG. 5 shows a structure of an organic electroluminescence.

FIG. 5 shows a structure of an organic EL. The organic electroluminescence is made of layers on a substrate (glass platen) EL1. A cathode layer EL2, an electron transport layer EL3, an emissive layer EL4, a hole transfer layer EL5, an anode layer EL6 and protective layers for the respective layers from scratches or moisture are formed on the substrate EL1. The electron transport layer EL3 and emissive layer EL4, and hole transfer layer EL5 are formed of organic materials. The anode layer EL6 is a transparent electrode formed of indium tin oxide (ITO). Light emits from the anode layer EL6 side.

(Fifth Embodiment)

Figure 6A:
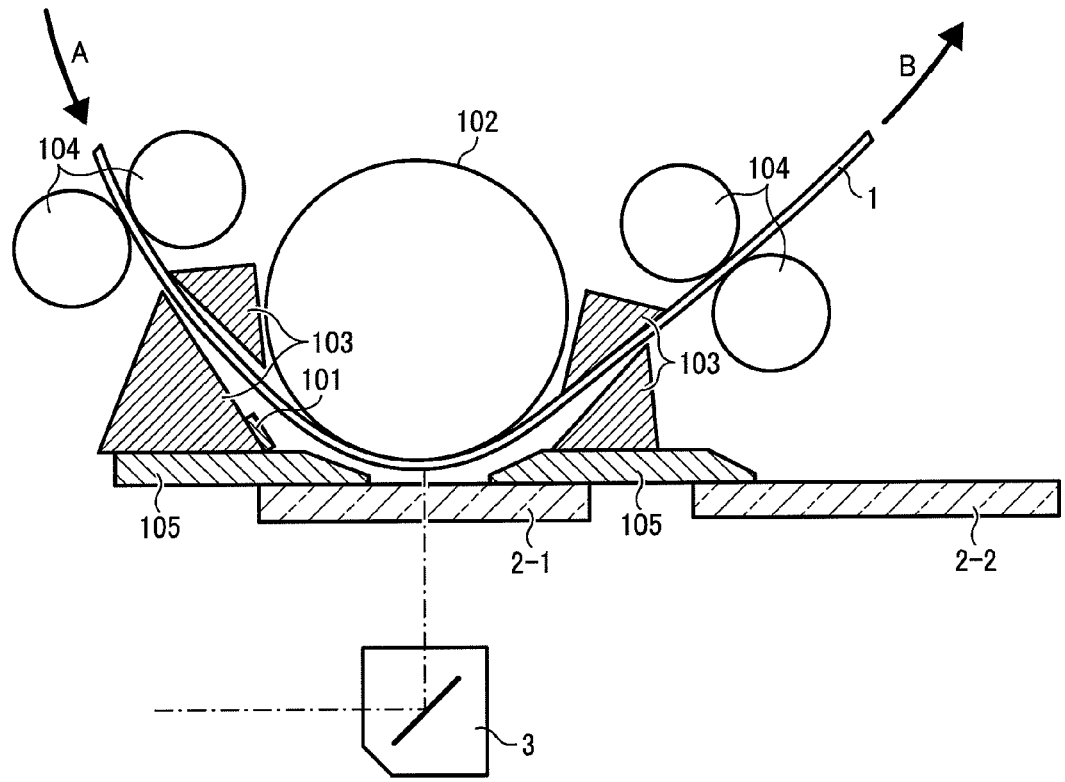
FIG. 6A shows a structure of an image reader according to a fifth embodiment of the present invention.
Figure 6B:
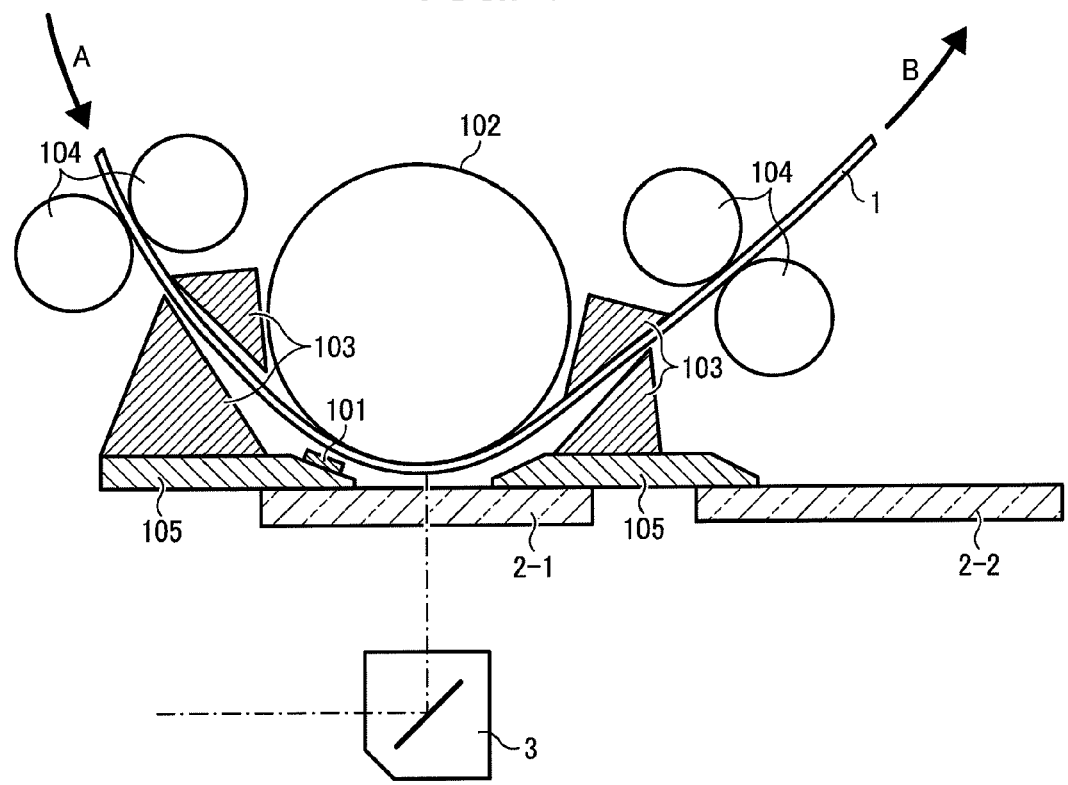
FIG. 6B shows another structure of the image reader according to the fifth embodiment of the present invention.

Moreover, the surface light source 101 can be tilted at an arbitrary angle. By tilting the surface light source, the light emitting surface thereof can be directed properly towards the document, thereby improving lighting efficiency. FIGS. 6A, 6B show examples in which the surface light source 101 is tilted at an arbitrary angle. FIG. 6A shows an example in which the surface light source 101 is formed in the document guide 103 while FIG. 6B shows an example in which the surface light source 101 is formed in the glass platen support member 105. As described above, it is possible to form an organic electroluminescence as the surface light source 101 on a tilted member relative to the document. Moreover, further improvement in the lighting efficiency is achieved by bending a part of the surface light source 101.

Figure 7:
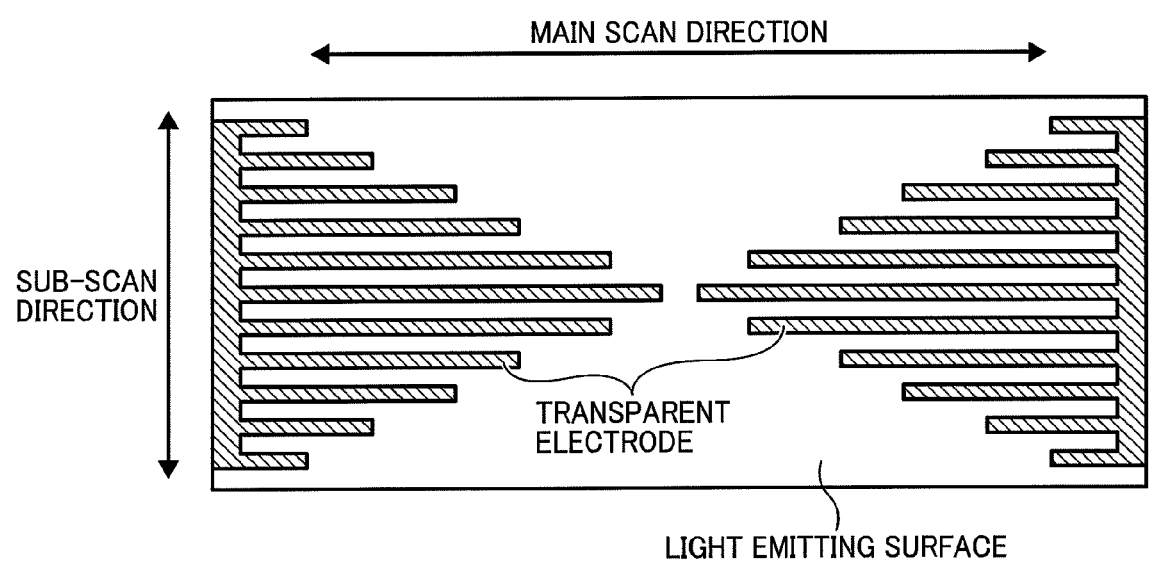
FIG. 7 shows an example of wiring of a surface light source.

Furthermore, with use of a reducing focusing lens as an optical system reading the document, an amount of light on the line sensor decreases depending on field of angle which varies by aperture efficiency of the focusing lens or cosine fourth law. To prevent this from happening, an amount of light from a periphery portion of the light source is set to be larger than that from a center portion thereof. In this manner, the amount of light is maintained to be even on the line sensor irrespective of field of angle. This can be achieved, for example, by setting wiring density of the periphery portion to be higher than that of the center portion in the cathode layer EL2 and anode layer EL6, as shown in FIG. 7. In FIG. 7 shaded portions show a layout of wiring formed on the cathode layer EL2 and anode layer EL6. In the emissive layer EL4, portions in the vicinity of the wiring emit light with highest intensity, and the further a portion positions from the wiring, the lower the intensity of light which it emits. Therefore, the amounts of light from the center and peripheral portions are adjustable by laying out the wiring to change the sizes of light emission areas in these portions.

(Sixth Embodiment)

Figure 8A:
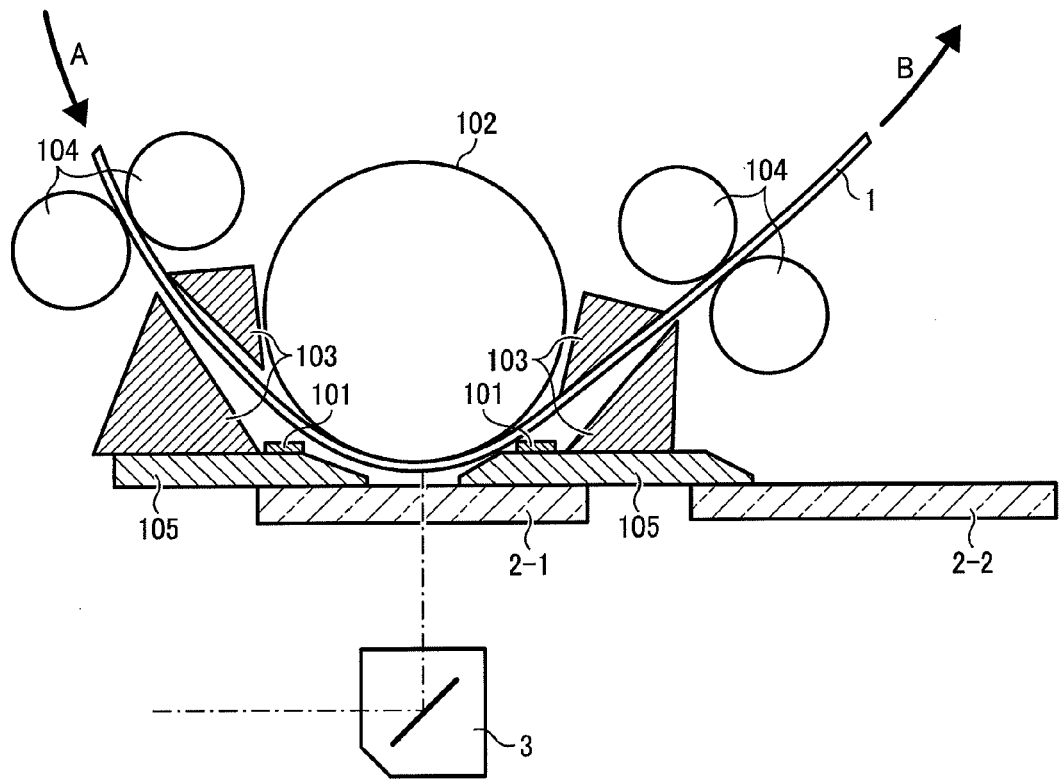
FIG. 8A shows a structure of an image reader according to a sixth embodiment of the present invention.
Figure 8B:
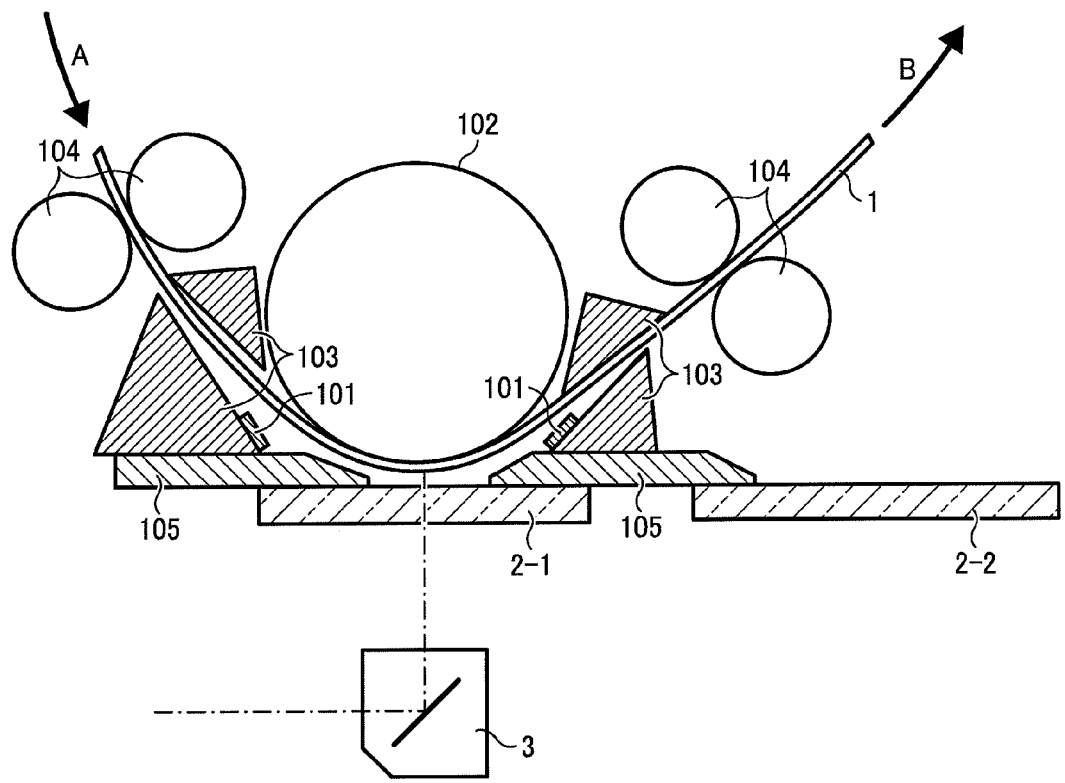
FIG. 8B shows another structure of the image reader according to the sixth embodiment of the present invention.

FIGS. 8A, 8B show examples where a plurality (two in the drawings) of surface light sources 101 are disposed to face each other in a sub scan direction. By disposing the two surface light sources 101 to face each other as shown in FIG. 8A, even when the document 1 is combined sheets of paper, the surface light sources 101 is able to illuminate the document 1 so as not to generate shadow of an overlapping portion. Accordingly, the image reader is able to read the document with high quality. The surface light sources 101 need not be disposed with a certain interval, and arrangement thereof is arbitrary. They can be arranged with equal or different distance from the document read position in the sub scan direction. As long as generation of the shadow of the overlapping portion is prevented, any arrangement is possible. Furthermore, a plurality (two) of surface light sources 101 can be tilted as shown in FIG. 8B. One or plural of the surface light sources 101 can be tilted and plural surface light sources can be tilted at different angles.

Further, to read document information in full color, the image reader according to the present embodiment can be configured to include a surface light source emitting white light as well as a color separation function in an arbitrary optical path of the optical system. There are various ways to form an organic EL to emit white light. One example is to perform color conversion to light from one emissive layer by a phosphor provided in the subsequent emissive layer. Another example is to stack a plurality of emissive layers emitting light with different wavelengths on one another. Other white light sources obtained by various techniques are usable for the surface light source. The color separation can be performed by any technique such as one to selectively insert a color separation prism or a color filter between a read lens and the line sensor for RGB color separation, or one to form an image on a light receiving plane of a so-called line CCD in which light receiving elements with RGB color filters are arranged in three arrays, and to thereby separate the image into three primary colors.

In the image reader according to the present embodiment, the surface light source 101 is disposed above the glass platen 2-2, so that the document 1 may directly contact with the surface light source. Contacting with the document 1 the surface light source 101 may get soiled, which leads to a decrease in the light amount and a deterioration in quality of a read image. Also, a locally soiled surface light source 101 may cause longitudinal undesirable bars in a read image. For prevention these problems from occurring, the document guide 103 is provided to prevent the document 1 from contacting with the surface light source 101 directly. Further, providing a protection sheet or coating on the entire glass platen 2-2 or the periphery portion of the surface light source 101 can achieve advantageous effects such as prevention of deterioration in quality of read images due to a soiled glass platen 2-2.

(Seventh Embodiment)

Figure 9:
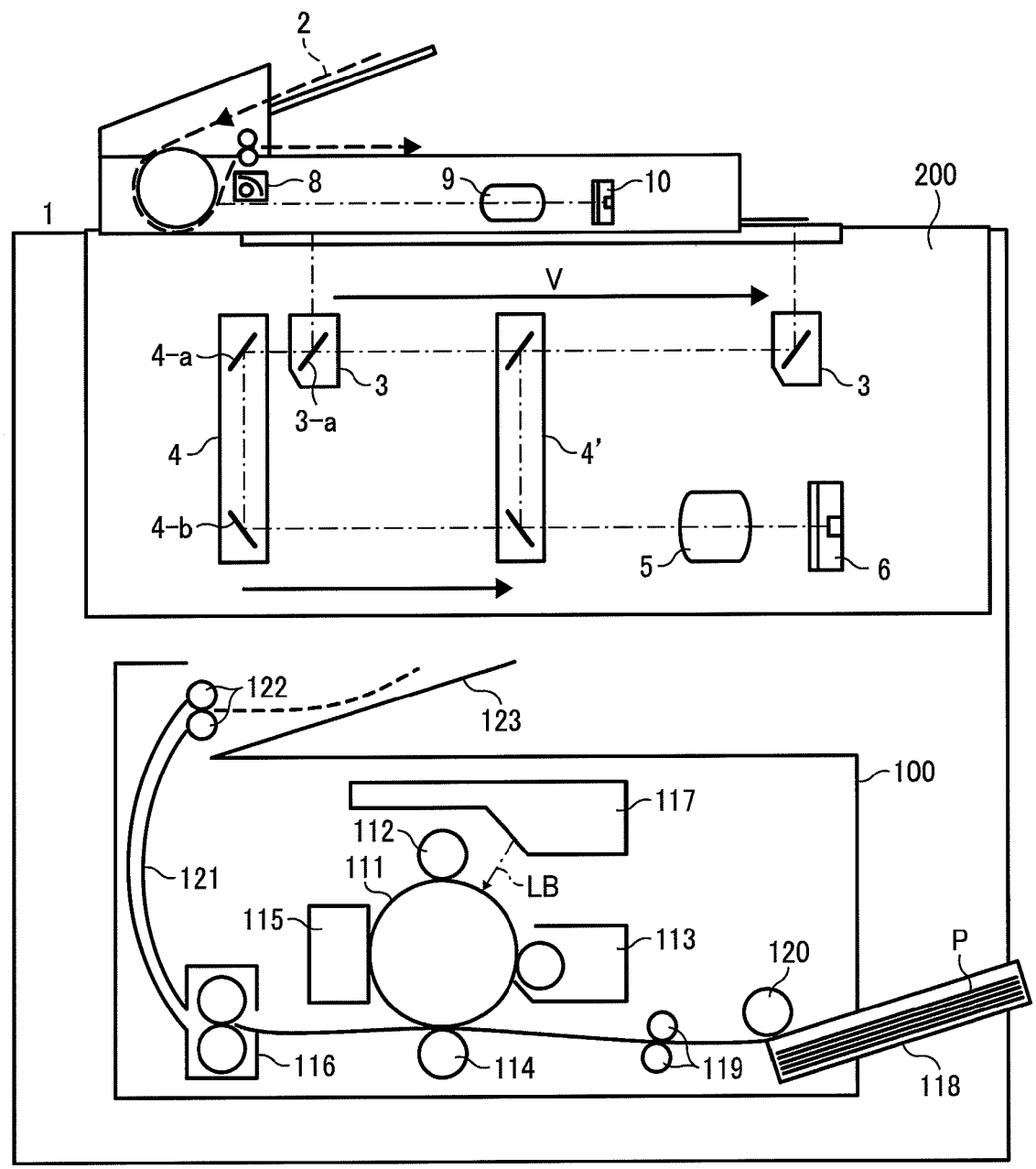
FIG. 9 shows a structure of a laser printer according to a seventh embodiment of the present invention.

FIG. 9 shows an example of a laser printer according to one embodiment of the present invention. A laser printer 100 comprises a photoconductor 111 in a cylindrical form, and a charge roller 112, a developer unit 113, a transfer roller 114, and a cleaning unit 115 which are around the photoconductor 111. The charge roller 112 can be a corona charger. The laser printer 100 further comprises an optical scan unit 117 scanning the surface of the photoconductor 111 with a laser beam LB to expose the photoconductor 111 between the charge roller 112 and the developer unit 113.

The laser printer 100 further comprises a fuser unit 116, a paper cassette 118 containing paper P, a resist roller pair 119, a feed roller 120, a paper feed path 121, a discharge roller pair 122, and a tray 123. For image generation, the photoconductor 111 is rotated clockwise at a constant speed, and the surface thereof is uniformly charged by the charge roller 112. The charged surface of the photoconductor 111 is exposed by the laser beam LB from the optical scan unit 117, to form an electrostatic latent image thereon which is a negative latent image and has an exposed image portion. This electrostatic latent image is inversely developed by the developer unit 113 to form a toner image on the surface of the photoconductor 111.

The paper cassette 118 contains paper P and is mounted detachably in the laser printer 100 as shown in FIG. 9. The uppermost sheet of paper P in the paper cassette 118 is extracted by the feed roller 120 and an end portion thereof is caught by the resist roller pair 119. The resist roller pair 119 delivers the paper P to a transfer unit at a timing at which the toner image on the photoconductor 111 is moved to a predetermined transfer position. The delivered paper P is superimposed on the toner image in the transfer unit for electrostatic transfer by the transfer roller 114. The paper P with the toner image is then delivered to the fuser unit 116 to fuse the toner image and discharged to the tray 123 through the paper feed path 121 by the discharge roller pair 122.

Remnant toner particles or paper particles are removed from the surface of the photoconductor 111 by the cleaning unit 115 after toner image transfer. The present embodiment describes an example in which the present invention is applied to an optical scan unit scanning the photoconductor 111 in an image formation apparatus which is configured to obtain desired images by forming electrostatic latent images on the photoconductor 111 by optical scanning and visualizing them with a toner.

(Eighth Embodiment)

Figure 10:
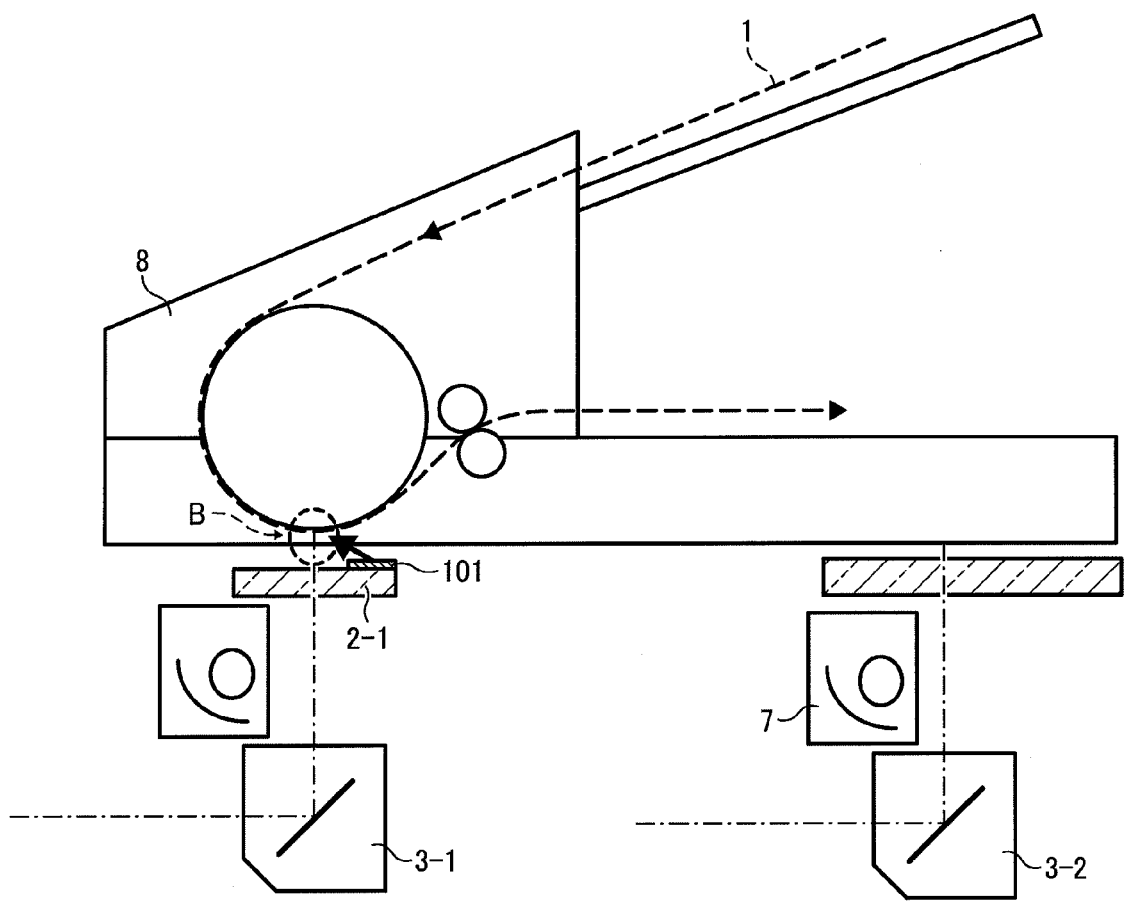
FIG. 10 shows a structure of an image reader according to an eighth embodiment of the present invention.

FIG. 10 schematically shows a sheet-through type image reader according to the eighth embodiment of the present invention. In this image reader the surface light source 101 of the illumination unit is directly formed on the surface of the glass platen 2-1. In sheet-through type reading the document 1 is fed by the ADF 8 in a direction indicated by a broken arrow in FIG. 10 and illuminated by the surface light source 101 at a position B. The light is reflected by the first mirror of the scanning member 3-1 and focused on the line sensor via the optical system in the same manner as in the prior art. In the platen type reading, the document is illuminated by the illumination system 7 provided in the first scanning member 3-2 to read document information by a moving first scanning member 3-2, as in the prior art.

In the image reader as configured above, the surface light source 101 is disposed at an arbitrary position between the upper surface of the glass platen 2-1 and the document 1 to be so close to the document 1 as to almost get in contact with the document 1 without light's passing through the glass platen 2-1. Accordingly, there is no total reflection on the incident and exit surfaces of the glass platen 2-1, and no loss in the amount of illumination, which enables the document 1 to be illuminated with proper illuminance. The illuminance on the document 1 is inversely proportional to a distance between the document 1 and the surface light source 101, so that placing the surface light source 101 close to the document 1 makes it possible to illuminate the document with sufficient illuminance without increasing amount of light from the surface light source 101. Further, forming the surface light source 101 to be long in a direction orthogonal to the document feed direction can increase the size of light emission area. Without special light-gathering means, it is possible to attain required illuminance on the document. Furthermore, as an illumination system, it does not need to include focusing means such as a lens or a prism which advantageously leads to downsizing the image reader.

(Ninth Embodiment)

Figure 11:
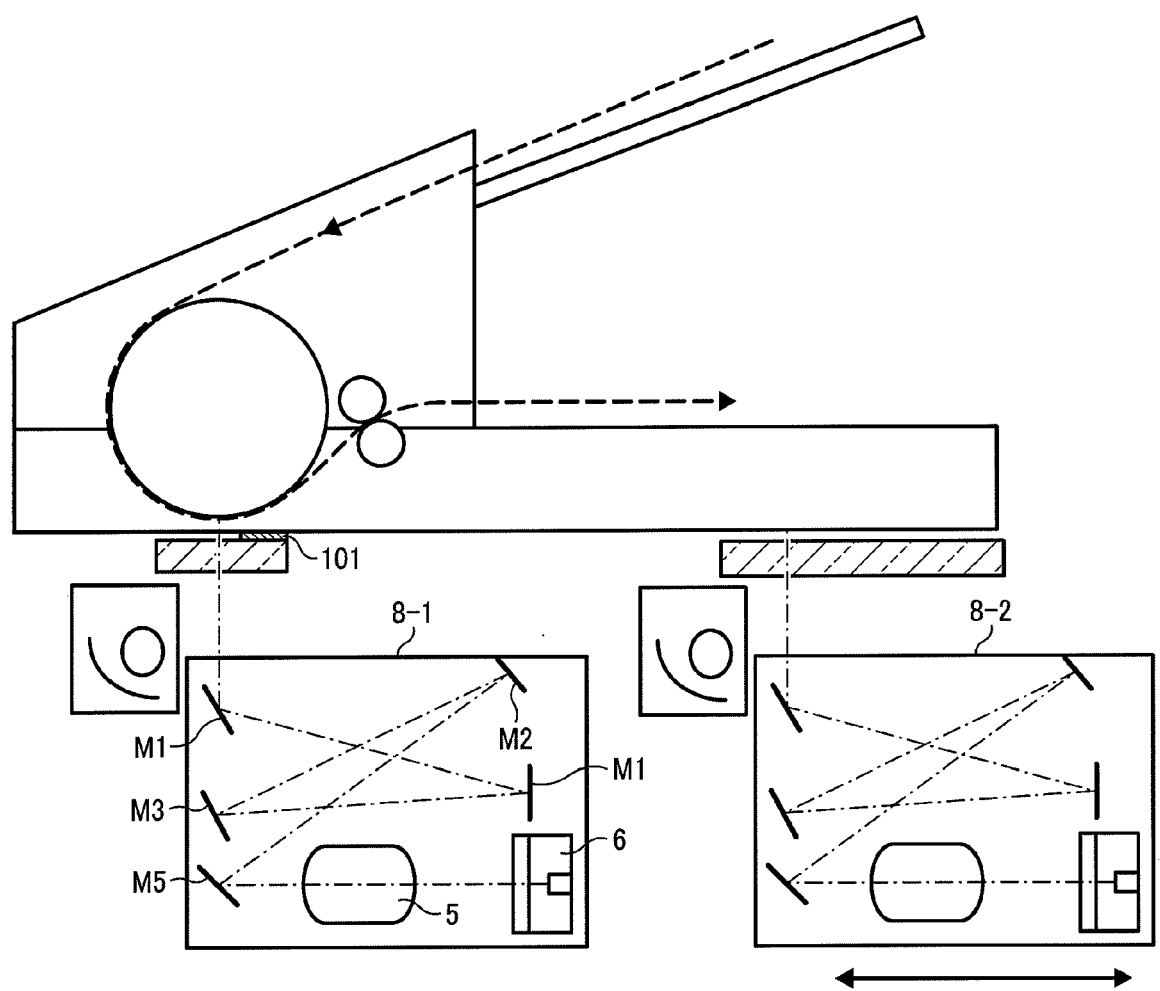
FIG. 11 shows a structure of an image reader according to a ninth embodiment of the present invention.

FIG. 11 shows an example of a sheet-through type image reader using an optical system integrated with a line sensor. In the drawing, while an optical system stops at a position 8-1, the document 1 is fed by the ADF and illuminated by the surface light source 101. The light from the document 1 is reflected by five mirrors M1 to M5, guided to the reducing focusing lens 5, and focused on the line sensor 6, to read document information. In the platen type reading, the illumination system 7 illuminates the document and the optical system including the illumination system moves to a position 8-2 to scan the document and read document information.

(Tenth Embodiment)

Figure 12:
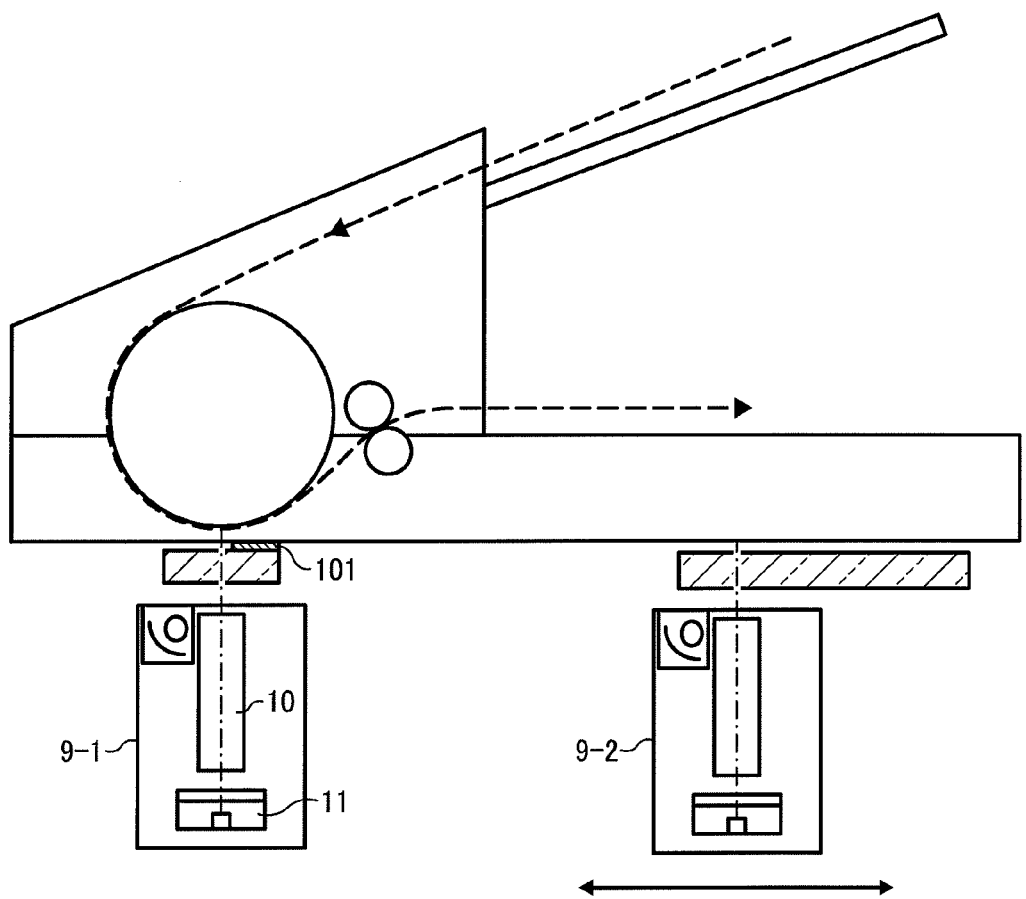
FIG. 12 shows an image reader according to a tenth embodiment of the present invention.

FIG. 12 shows an example of a sheet-through type image reader using an optical system with lens magnifier=1. In the drawing while an optical system having a focusing element 10 (lens magnifier=1) stops at a position 9-1, the document 1 is fed by the ADF and illuminated by the surface light source 101. Light from the document 1 is focused on a line sensor 11

(magnifier=1) by the focusing element 10, to read document information. In the platen type reading, the optical system including the illumination system 7 moves to a position 9-2 to scan the document and read document information.

Figure 13:
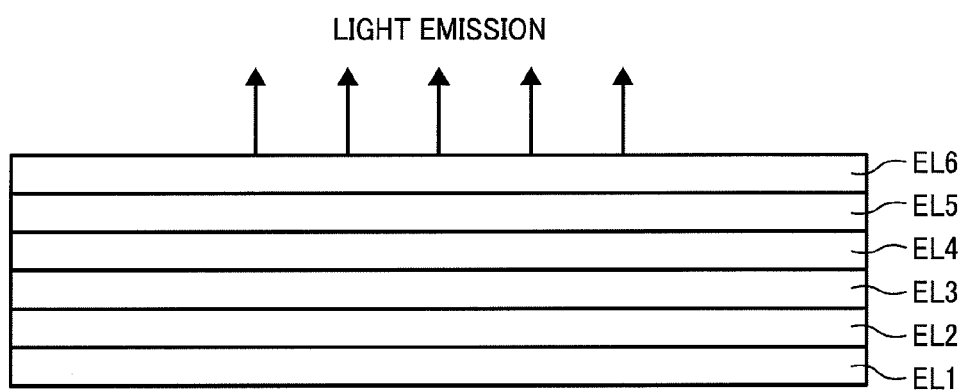
FIG. 13 shows a structure of an organic electroluminescence.

FIG. 13 shows a structure of an organic EL used for the surface light source 101. The organic electroluminescence is made of layers on a substrate (glass platen 2-1) EL1. A cathode layer EL2, an electron transport layer EL3, an emissive layer EL4, a hole transfer layer EL5, an anode layer EL6 and protective layers for the respective layers from scratches or moisture are formed on the substrate EL1, as in FIG. 5. The electron transport layer EL3 and emissive layer EL4, and hole transfer layer EL5 are formed of organic materials. The anode layer EL6 is a transparent electrode formed of indium tin oxide (ITO). Light emits from the anode layer EL6 side.

Figure 14A:
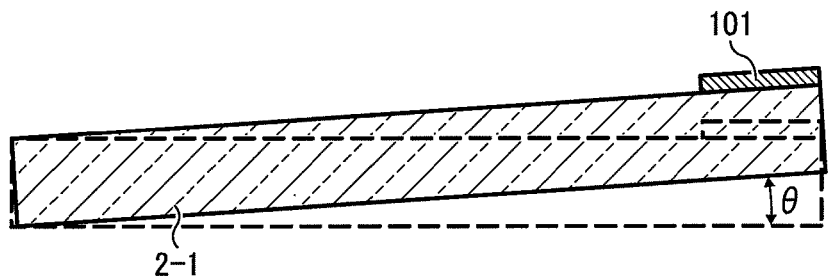
FIGS. 14A to 14C show examples of a glass platen tilted at arbitrary angles.
Figure 14B:
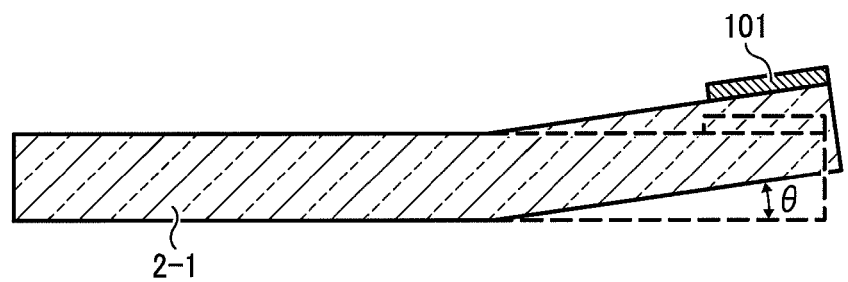
Figure 14C:
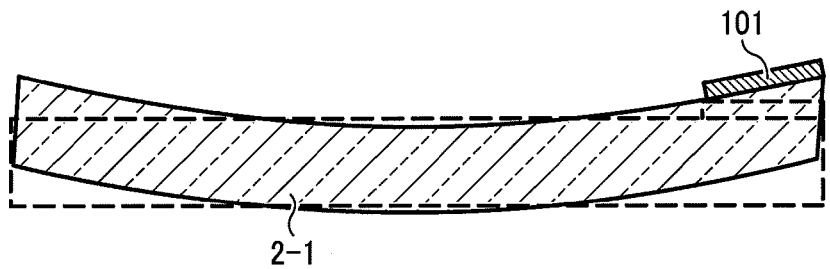

Moreover, the glass platen 2-1 can be tilted at an arbitrary angle. By tilting the glass platen 2-1, the light emitting surface thereof can be directed properly towards the document to thereby improve lighting efficiency. FIGS. 14A to 14C show examples in which the glass platen 2-1 is tilted at an arbitrary angle. In FIG. 14A the entire glass platen 2-1 is tilted at angle θ, in FIG. 14B a part of the glass platen 2-1 is tilted at angle θ, and in FIG. 14C the entire glass platen 2-1 is bended. The bending of the glass platen 2-1 can be partial.

Furthermore, with use of a reducing focusing lens as an optical system reading the document, an amount of light on the line sensor decreases depending on field of angle which varies by aperture efficiency of the focusing lens or cosine fourth law. To prevent this from happening, an amount of light from a periphery portion of the light source is set to be larger than that from a center portion thereof. In this manner, the amount of light is maintained to be even irrespective of field of angle. This can be achieved, for example, by setting wiring density of the periphery portion to be higher than that of the center portion in the cathode layer EL2 and anode layer EL6, as described above referring to FIG. 7. In FIG. 7 shaded portions show a layout of wiring formed on the cathode layer EL2 and anode layer EL6. In the emissive layer EL4, portions in the vicinity of the wiring emit light with highest intensity, and the further a portion positions from the wiring, the lower the intensity of light which it emits. Therefore, the amounts of light from the center and peripheral portions are adjustable by laying out the wiring to change the sizes of light emission areas in these portions.

(Eleventh Embodiment)

Figure 15A:
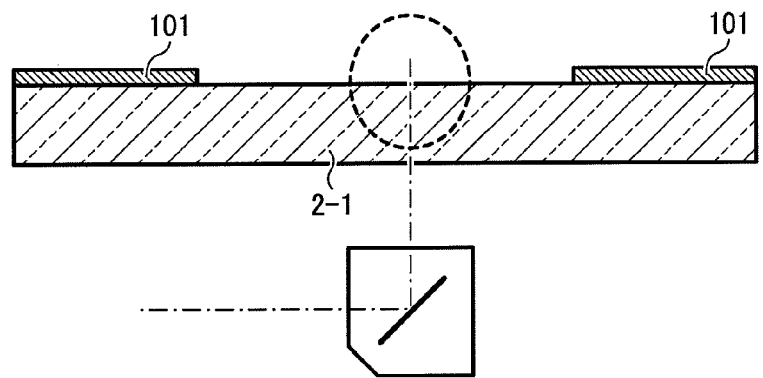
FIGS. 15A to 15C show examples of arrangement of plural surface light sources in an image reader according to an eleventh embodiment of the present invention.
Figure 15B:
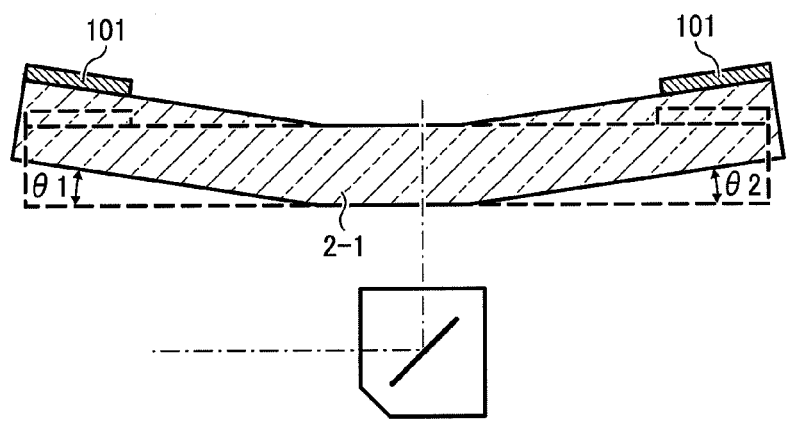
Figure 15C:
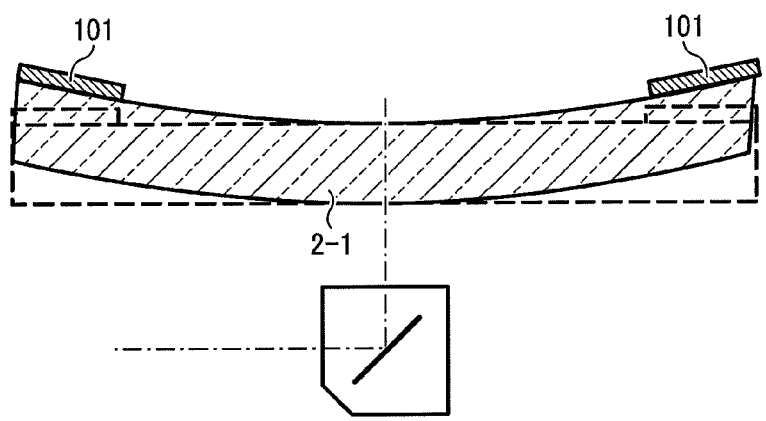

FIGS. 15A to 15C show examples where a plurality (two in the drawings) of surface light sources 101 are disposed to face each other in the sub scan direction. In such a configuration, even when the document 1 is combined sheets of paper, the surface light sources 101 is able to illuminate the document 1 so as not to generate shadow of an overlapping portion. Accordingly, the image reader is able to read the document with high quality. The surface light sources 101 need not be disposed with a certain interval as long as it does not block the read position. They can be arranged with equal or different distance from the document read position in the sub scan direction. As long as generation of the shadow of the overlapping portion is prevented, any arrangement is possible. Furthermore, a plurality (two) of surface light sources 101 can be tilted as shown in FIG. 15B. One or plural of the surface light sources 101 can be tilted. Also, the tilt angles θ1, θ2 thereof can be different.

Further, to read document information in full color, the image reader according to the present embodiment n can be configured to include a surface light source emitting white light as well as a color separation function in an arbitrary optical path of the optical system. There are various ways to form an organic EL to emit white light. One example is to perform color conversion to light from one emissive layer by a phosphor provided in the subsequent emissive layer. Another example is to stack a plurality of emissive layers emitting light with different wavelengths on one another. Other white light sources obtained by various techniques are usable for the surface light source. The color separation can be performed by any technique such as one to selectively insert a color separation prism or a color filter between a read lens and the line sensor for RGB color separation, or one to form an image on a light receiving plane of a so-called line CCD in which light receiving elements with RGB color filters are arranged in three arrays, and to thereby separate the image into three primary colors.

(Twelfth Embodiment)

Figure 16:
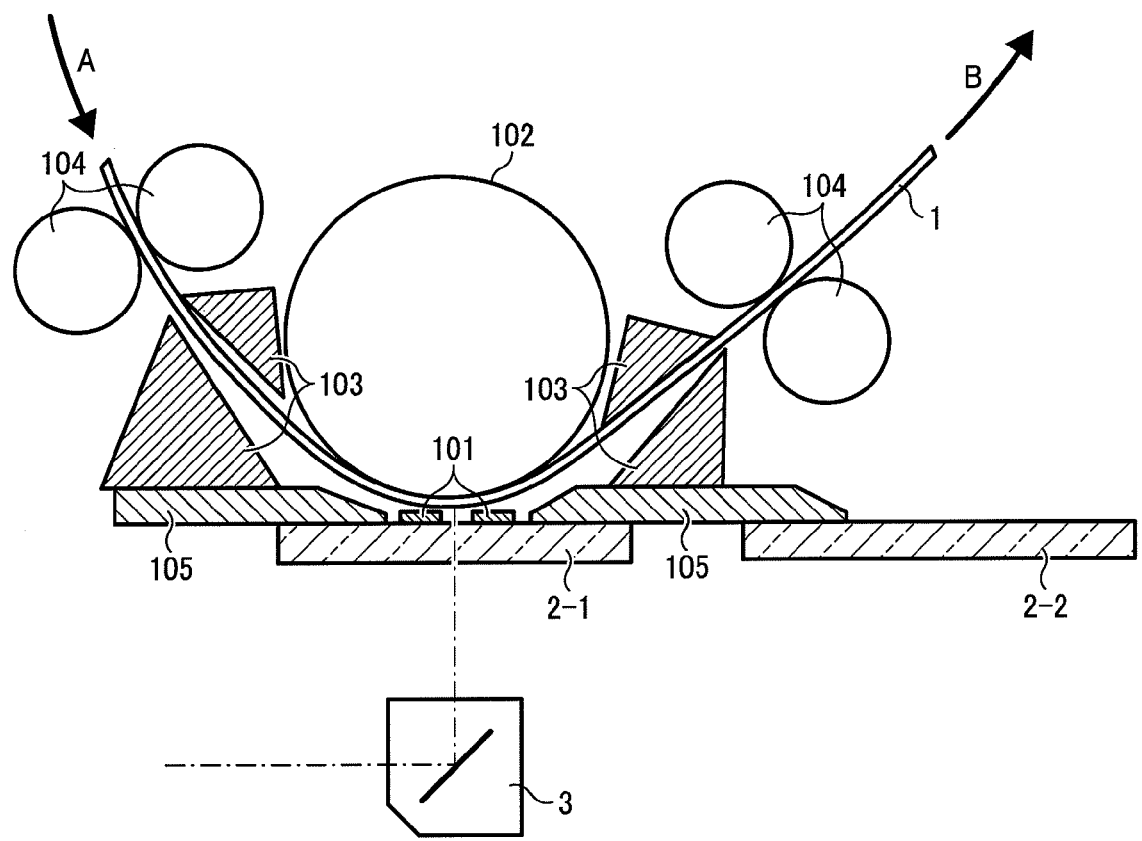
FIG. 16 shows a structure of an image reader according to a twelfth embodiment of the present invention.
Figure 17:
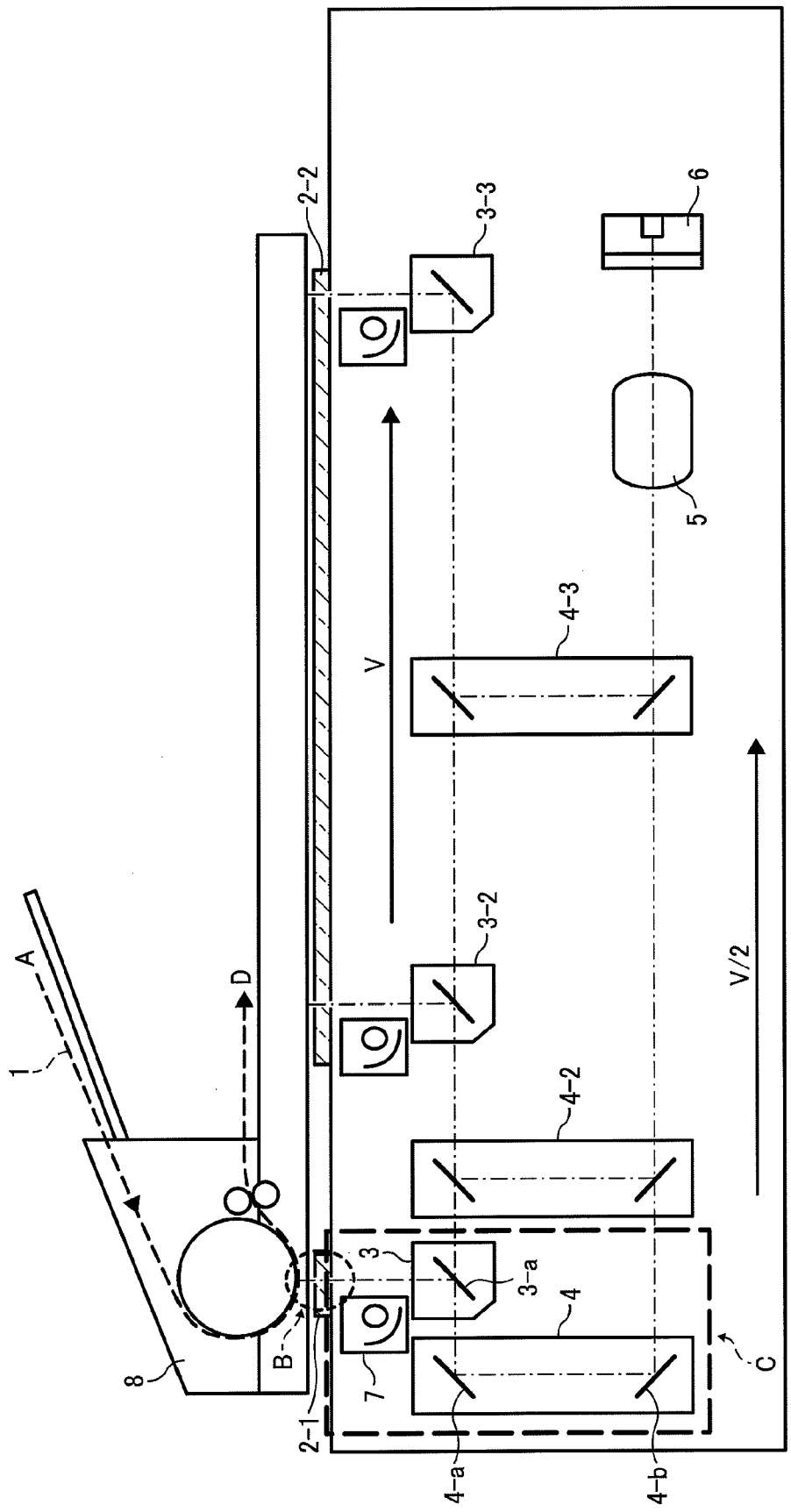
FIG. 17 shows a structure of a prior art image reader.
Figure 18A:
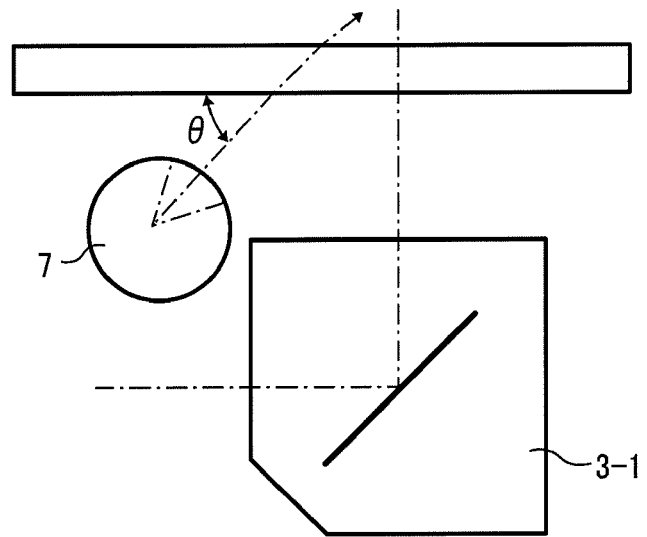
FIGS. 18A, 18B schematically show examples of structure of an illumination unit of a prior art image reader.
Figure 18B:
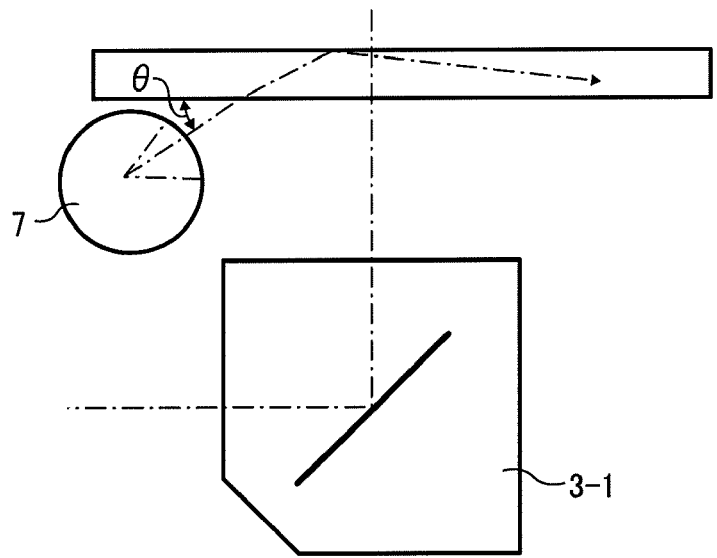

In the image reader according to the present embodiment, the surface light source 101 is disposed above the glass platen 2-1, so that the document 1 may directly contact with the surface light source. Contacting with the document directly, the surface light source 101 may get soiled, leading to a deterioration in quality of a read image due to a decrease in the light amount. Also, a locally soiled surface light source 101 may cause longitudinal undesirable bars in a read image. For prevention of these problems, the document guide 103 is provided to prevent the document 1 from contacting with the surface light source 101 directly, as shown in FIG. 16. Further, providing a protection sheet or coating on the entire glass platen 2-1 or the periphery portion of the surface light source 101 can achieve advantageous effects such as prevention of deterioration in quality of read images due to a soiled glass platen 2-1.

As described through the above embodiments, with the image reader according to the present invention, it is possible to slim down the illumination system and efficiently illuminate the document with reduced electric power. Further, compared with the platen type (book type) reading, the light source can be disposed closer to the document to illuminate it with high luminance. Accordingly, this image reader is able to perform high-speed reading which requires a large amount of light.

In the image reader according to the present invention, the illumination unit is disposed between the upper surface of the glass platen and the document. Also, the surface light source is directly formed on the glass platen in the illumination unit. Accordingly, there is no total reflection on the incident and exit surfaces of the glass platen, and no loss of light, which enables the document to be illuminated with proper illuminance. Placing the surface light source close to the document makes it possible to illuminate the document with sufficient illuminance without increasing amount of light from the surface light source. Further, forming the shape of the surface light source to be long in a direction orthogonal to the document feed direction can increase light emission areas. Without special light-gathering means, it is possible to attain required illuminance for the document. Furthermore, the illumination system does not need to include focusing means such as a lens or a prism, which advantageously leads to downsizing the image reader.

Further, in the image reader according to the present invention, using an organic EL for the surface light source makes it possible to form the surface light source in an arbitrary member which is disposed close to a read position of a sheet-through document feed path. This eliminates the necessity for components such as a support member for the surface light source, reducing the number of components and achieving a small sized illumination unit with sufficient illuminance on the document.

Further, in the image reader according to the present invention, the surface light source is tilted at an arbitrary angle. This accordingly allows the light emitting surface of the surface light source to be directed properly to the document, thereby improving the lighting efficiency.

Further, in the image reader according to the present invention, amounts of light which a central portion and a peripheral portion of the surface light source emit are independently variable, and the surface light source is set to emit light so that amounts of light are even on the document when the document reader unit reads the document irrespective of field of angle. Accordingly, the amount of light can be maintained to be even on the line sensor irrespective of field of angle.

The image reader according to the present invention is configured to include the plurality of surface light sources disposed to face each other in the direction orthogonal to the feed direction. This makes it possible for the image reader to illuminate a document so as not to generate shadow of an overlapping portion even when the document is combined sheets of paper, achieving high quality reading.

Moreover, the image reader according to the present invention is configured to include the illumination unit illuminating with white light, so that it can read document information in full color.

In the image reader according to the present invention, the document reader unit includes a color separation portion to read document information in colors. This allows white light sources by various techniques to be usable for the surface light source.

The image reader according to the present invention is configured to include the protector portion protecting the illumination unit from getting soiled. The protector portion is a document guide to prevent a document from directly contacting with the illumination unit. This accordingly can prevent a reduction of amount of lights caused by a soiled surface light source and a deterioration in image reading quality.

Further, the image formation apparatus according to the present invention is configured to include the above-mentioned image reader so that it can achieve downsizing and power saving.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An image reader comprising:
   a document feeder unit feeding a document in a predetermined direction;
   a glass platen provided below the document feeder unit;
   an illumination unit provided on or above the glass platen and comprising a surface light source which is long in a direction orthogonal to the predetermined direction and illuminates the document; and
   a document reader unit reading information about the document at a still position from below the glass platen, wherein
   the surface light source is configured to emit a larger amount of light from a peripheral portion than a central portion in a longitudinal direction.

2. An image reader according to claim 1, wherein the illumination unit is disposed between an upper surface of the glass platen and the document.

3. An image reader according to claim 1, wherein the surface light source is directly formed on the glass platen.

4. An image reader according to claim 1, wherein the surface light source is an organic electroluminescence.

5. An image reader according to claim 1, wherein the surface light source is tilted at an arbitrary angle.

6. An image reader according to claim 1, wherein
   the illumination unit comprises a plurality of surface light sources which are disposed to face each other in the direction orthogonal to the predetermined direction.

7. An image reader according to claim 1, wherein the illumination unit illuminates with white light.

8. An image reader according to claim 1, wherein:
   the document reader unit comprises an optical system which includes a color separation portion on an optical path; and
   the document reader unit reads the information about the document in colors.

9. An image reader according to claim 1, further comprising a protector portion which protects the illumination unit from getting soiled.

10. An image reader according to claim 9, wherein
    the protector portion is a document guide which guides the document to a feed path and prevents the document from directly contacting with the illumination unit.

11. An image formation apparatus comprising the image reader according to claim 1.

* * * * *